US012693812B2

(12) United States Patent
Nagase

(10) Patent No.: US 12,693,812 B2
(45) Date of Patent: Jul. 28, 2026

(54) PORTABLE TERMINAL APPARATUS, PRINTING SERVICE SYSTEM, NON-TRANSITORY COMPUTER READABLE MEDIUM STORING PROGRAM, AND METHOD

(71) Applicant: FUJIFILM Business Innovation Corp., Tokyo (JP)

(72) Inventor: Sho Nagase, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/189,239

(22) Filed: Mar. 24, 2023

(65) Prior Publication Data

US 2024/0103774 A1     Mar. 28, 2024

(30) Foreign Application Priority Data

Sep. 26, 2022     (JP) ................................. 2022-152246

(51) Int. Cl.
*G06F 3/12*          (2006.01)
(52) U.S. Cl.
CPC .......... *G06F 3/1204* (2013.01); *G06F 3/1217* (2013.01); *G06F 3/1236* (2013.01);
(Continued)
(58) Field of Classification Search
None
See application file for complete search history.

(56) References Cited

U.S. PATENT DOCUMENTS

2013/0050741 A1\*  2/2013  Raja ..................... G06F 3/1204
                                             358/1.15
2015/0378652 A1\*  12/2015  Sakurai ................. G06F 3/1292
                                             358/1.15
(Continued)

FOREIGN PATENT DOCUMENTS

JP          2002305707         10/2002
JP          2013162313         8/2013
(Continued)

OTHER PUBLICATIONS

"Notice of Reasons for Refusal of Japan Counterpart Application", issued on Jun. 2, 2026, with English translation thereof, p. 1-p. 5.

*Primary Examiner* — Darryl V Dottin
(74) *Attorney, Agent, or Firm* — JCIPRNET

(57) ABSTRACT
A portable terminal apparatus includes a processor, and a wireless communicator, in which the processor is configured to acquire a printing required time required for printing a file, while a user carrying the portable terminal apparatus is moving to a printing apparatus to be used for printing the file, acquire a first movement required time as a movement time of the user required for arriving at the printing apparatus from a wireless communication apparatus that is wirelessly connected to the wireless communicator and that is installed separately from the printing apparatus, and in a case where the wireless communicator is wirelessly connected to the wireless communication apparatus, perform a control of instructing the printing apparatus to print the file at a point in time when the first movement required time becomes less than or equal to the printing required time.

9 Claims, 12 Drawing Sheets

(52) U.S. Cl.
CPC ............ *G06F 3/126* (2013.01); *G06F 3/1288*
(2013.01); *G06F 3/1292* (2013.01)

(56)                    References Cited

U.S. PATENT DOCUMENTS

| | | | |
|---|---|---|---|
| 2019/0139017 | A1 | 5/2019 | Malinofsky et al. |
| 2022/0021781 | A1* | 1/2022 | Iwasaki .............. H04N 1/00214 |

FOREIGN PATENT DOCUMENTS

| | | |
|---|---|---|
| JP | 2016151950 | 8/2016 |
| JP | 2021503108 | 2/2021 |

* cited by examiner

401 CPU

402 ROM

403 RAM

404 STORAGE

405 TOUCH PANEL

406 GPS

407 NETWORK IF

408 Wi-Fi

409 Bluetooth

410 NFC

FIG. 5

MOVEMENT TIME INFORMATION [SECONDS]

| STORE | MULTIFUNCTION PERIPHERAL | AT1 | | | AT2 | | AT3 | AT4 |
|---|---|---|---|---|---|---|---|---|
| | | WF1 | WF2 | WF3 | Gate 1 | Gate 2 | BT | CAMERA |
| Shop 1 | | – | – | – | – | – | – | – |
| Shop 2 | | – | – | – | – | – | – | – |
| Shop 3 | | – | – | – | – | – | – | – |
| Shop 4 | MFP1 | 120 | 90 | 40 | 10 | 20 | 5 | 0 |
| ⋮ | | | | | | | | |

FIG. 6

EQUIPMENT MANAGEMENT INFORMATION

| LOCATION | EQUIPMENT NAME | UNIQUE INFORMATION |
|---|---|---|
| FACILITY | WF1 | SSID-WF1 |
| | WF2 | SSID-WF2 |
| | WF3 | SSID-WF3 |
| Shop 1 | · · · | |
| · · · | | |
| Shop 4 | MFP1 | MFPID1, INSTALLATION POSITION INFORMATION |
| | Gate 1 | GateS4-1 |
| | Gate 2 | GateS4-2 |
| · · · | | |

FIG. 7

MULTIFUNCTION PERIPHERAL MANAGEMENT INFORMATION

| MULTIFUNCTION PERIPHERAL | | | BT | FACILITY | STORE |
|---|---|---|---|---|---|
| EQUIPMENT NAME | UNIQUE INFORMATION | MODEL | | | |
| MFP1 | MFPID1 | MFP-ABC | BT1 | mall 1 | shop 4 |
| MFP2 | MFPID2 | MFP-DEF | BT2 | mall 2 | shop α |
| ⋮ | | | | | |

FIG. 8

MULTIFUNCTION PERIPHERAL PERFORMANCE INFORMATION

| MODEL | PERFORMANCE |
|---|---|
| MFP–ABC | A4 GRAYSCALE: 81 SHEETS/MINUTE, A4 COLOR: 81 SHEETS/MINUTE, COMMUNICATION SPEED: v1 MB/sec, SLEEP RECOVERY TIME: s1 SECONDS |
| MFP–DEF | A4 GRAYSCALE: 47 SHEETS/MINUTE, A4 COLOR: 47 SHEETS/MINUTE, COMMUNICATION SPEED: v2 MB/sec, SLEEP RECOVERY TIME: s2 SECONDS |
| . . . . | |

FIG. 11

EXPECTED MOVEMENT TIME INFORMATION

| DETECTION EQUIPMENT | | EXPECTED MOVEMENT TIME | |
|---|---|---|---|
| EQUIPMENT NAME | UNIQUE INFORMATION | SYMBOL | TIME |
| GPS | | AT0 | |
| WF1 | SSIDWF1 | AT1 | 120 SECONDS |
| WF2 | SSIDWF2 | | 90 SECONDS |
| WF3 | SSIDWF3 | | 40 SECONDS |
| Gate 1 | GateID1 | AT2 | 10 SECONDS |
| Gate 2 | GateID2 | | 20 SECONDS |
| MFP1 (Bluetooth) | BT1 | AT3 | 5 SECONDS |
| MFP1 (CAMERA) | | AT4 | 0 SECONDS |

PORTABLE TERMINAL APPARATUS, PRINTING SERVICE SYSTEM, NON-TRANSITORY COMPUTER READABLE MEDIUM STORING PROGRAM, AND METHOD

CROSS-REFERENCE TO RELATED APPLICATIONS

This application is based on and claims priority under 35 USC 119 from Japanese Patent Application No. 2022-152246 filed Sep. 26, 2022.

BACKGROUND

(i) Technical Field

The present invention relates to a portable terminal apparatus, a printing service system, a non-transitory computer readable medium storing a program, and a method.

(ii) Related Art

Currently, cashierless unmanned stores that enable shopping without payment in a real store are present. Since payment is not necessary, a user can simply leave the store in a case where shopping is finished. That is, "waiting" such as lining up at a checkout is eliminated.

In recent years, a printing service called net print through a network has been provided. In the printing service, the user can execute printing to obtain a printed matter by uploading a document to be printed in advance and inputting a reservation number issued in the uploading into a multifunction peripheral installed in an intended convenience store or the like.

In a case where application of the printing service to the above cashierless unmanned stores is considered, a user operation with respect to the multifunction peripheral is necessary. Thus, "waiting" may occur until the printed matter is output.

Therefore, in the related art, a technology for calculating, in advance, a required time required for printing, calculating a movement time required until a user arrives at an installation position of a multifunction peripheral, at a predetermined time interval based on wireless communication between the multifunction peripheral and a portable terminal carried by the user, and starting execution of the printing at a point in time when the movement time is less than or equal to the required time has been suggested so that "waiting" does not occur until the output of the printed matter is finished (for example, JP2013-162313A).

SUMMARY

However, for example, in a case of performing only distance measurement based on wireless communication between a portable terminal apparatus and a printing apparatus, for example, there is a possibility of error occurring in a measured distance because of an effect of a surrounding environment such as other electric waves, in a state where strength of electric waves exchanged between the portable terminal apparatus and the printing apparatus is relatively not strong. In addition, in a case where the user is away from the printing apparatus, that is, unless the portable terminal apparatus approaches a range in which wireless communication can be performed with the printing apparatus, the distance measurement cannot be performed. That is, depending on a situation of movement of the user, there is a possibility that printing cannot be finished at a point in time when the user arrives at the printing apparatus.

Aspects of non-limiting embodiments of the present disclosure relate to a portable terminal apparatus, a printing service system, a non-transitory computer readable medium storing a program, and a method that make a finish time of printing accurately coincide with a point in time when a user arrives at a printing apparatus, compared to a case of using only distance measurement based on wireless communication with the printing apparatus.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a portable terminal apparatus including a processor, and a wireless communicator, in which the processor is configured to acquire a printing required time required for printing a file, while a user carrying the portable terminal apparatus is moving to a printing apparatus to be used for printing the file, acquire a first movement required time as a movement time of the user required for arriving at the printing apparatus from a wireless communication apparatus that is wirelessly connected to the wireless communicator and that is installed separately from the printing apparatus, and in a case where the wireless communicator is wirelessly connected to the wireless communication apparatus, perform a control of instructing the printing apparatus to print the file at a point in time when the first movement required time becomes less than or equal to the printing required time.

BRIEF DESCRIPTION OF THE DRAWINGS

Exemplary embodiment(s) of the present invention will be described in detail based on the following figures, wherein:

FIG. 2 is a hardware configuration diagram of a portable terminal apparatus in the present exemplary embodiment;

FIG. 5 is a diagram illustrating an example of a data configuration of movement time information in the present exemplary embodiment;

FIG. 6 is a diagram illustrating an example of a data configuration of equipment management information in the present exemplary embodiment;

FIG. 7 is a diagram illustrating an example of a data configuration of multifunction peripheral management information in the present exemplary embodiment;

FIG. 8 is a diagram illustrating an example of a data configuration of multifunction peripheral performance information in the present exemplary embodiment;

FIG. 11 is a diagram illustrating an example of a data configuration of expected movement time information in the present exemplary embodiment;

DETAILED DESCRIPTION

Hereinafter, an exemplary embodiment of the present invention will be described based on the drawings.

Figure 1:
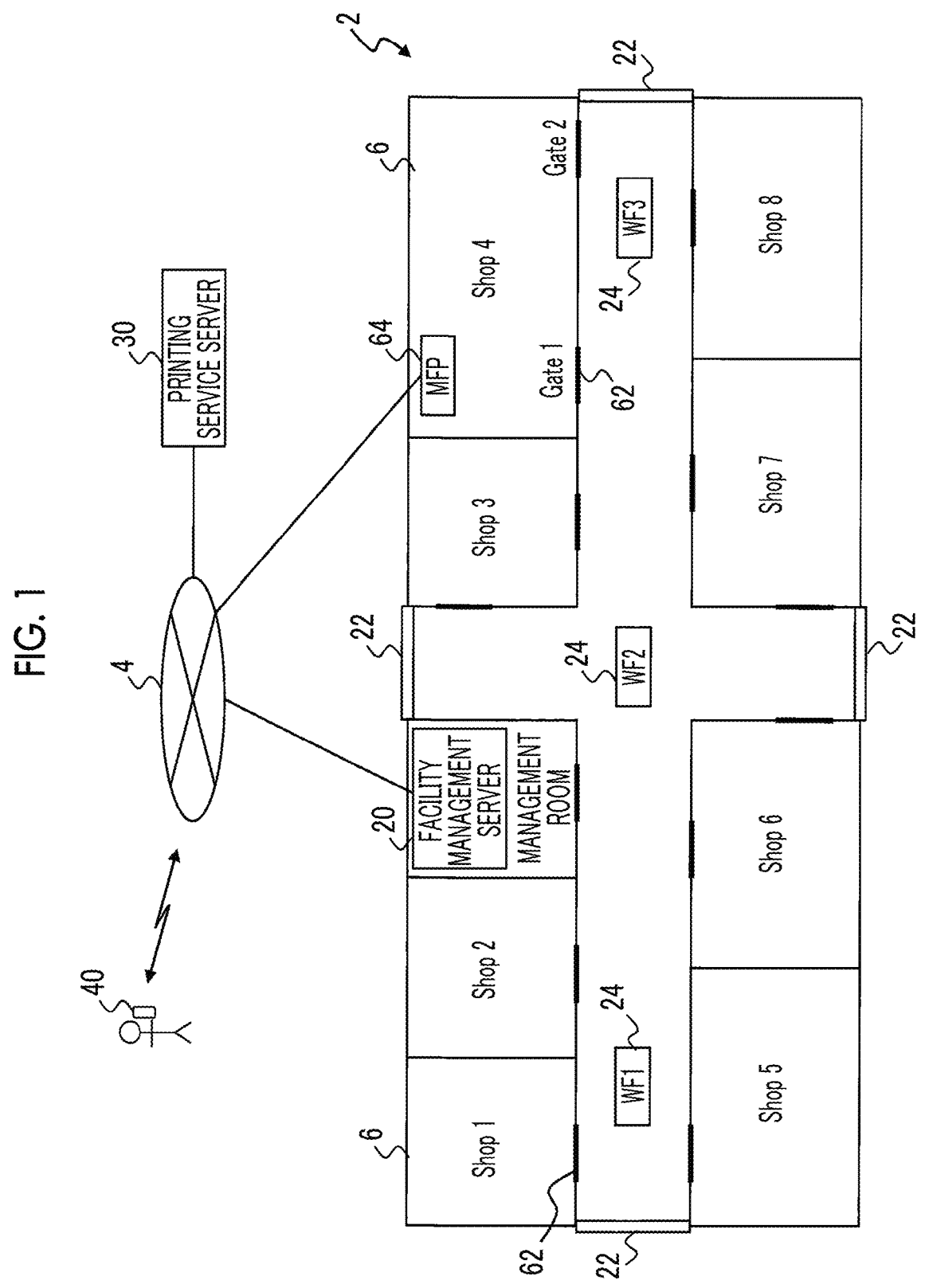
FIG. 1 is an overall configuration diagram of a printing service system in the present exemplary embodiment.

FIG. 1 is an overall configuration diagram of a printing service system in the present exemplary embodiment. In FIG. 1, a configuration in which a facility management server 20 installed in a facility 2, a printing service server 30 that provides a printing service to a user, and a portable terminal apparatus 40 carried by the user are connected in a wired or wireless manner via a network 4 such as the Internet is illustrated.

The facility 2 is a facility such as a shopping mall including a plurality of stores 6 (in FIG. 1, eight stores). Each store 6 is used by a visitor, that is, the user carrying the portable terminal apparatus 40 in the present exemplary embodiment. The user enters from any of a plurality of entrances 22 (in FIG. 1, four locations) provided in the facility 2 and walks to move to a target store 6.

The stores 6 are an example of sections provided in the facility 2. Each store 6 is provided with one or a plurality of gates 62 for the user to enter into and exit from the section. The user always enters through the gates 62. In FIG. 1, the gates 62 is illustrated by a thick line. A wireless communication apparatus (not illustrated) to which the user holds the portable terminal apparatus 40 to wirelessly connect the portable terminal apparatus 40 using the near field communication (NFC) standard is arranged in the gate 62. The wireless communication apparatus is installed at entrances of the stores 6 in the facility 2 as a predetermined position.

In addition, one or a plurality of access points 24 (in FIG. 1, three points) that provide a wireless communication service using Wi-Fi (registered trademark) to the user are installed in the facility 2. The access points 24 are an example of the wireless communication apparatuses installed in the facility 2. The access points 24 are installed in a passage or the like in the facility 2 as a predetermined position.

Furthermore, a multifunction peripheral 64 adapted for the printing service is installed in the facility 2 as a printing apparatus. In the present exemplary embodiment, the multifunction peripheral 64 is installed in only one store 6 (Shop 4) in the facility 2 as illustrated in FIG. 1.

While each equipment is installed in the facility 2 illustrated in FIG. 1 as described above, a layout of the facility 2, the number of entrances 22, access points 24, and stores 6, the number of gates 62 in each store 6, whether or not the multifunction peripheral 64 is installed in each store 6, and the number of installed multifunction peripherals 64 in each store 6 are an example, and the present invention is not limited thereto. In addition, not all sections are necessarily the stores 6. For example, some sections may be spaces such as an event venue.

In the present exemplary embodiment, while a shopping mall or the like including the plurality of stores 6 is assumed as the facility 2, the facility 2 may be a single store. In addition, while a plurality of users may use the facility 2, each portable terminal apparatus 40 used by each user may have the functions described later. Thus, only one portable terminal apparatus 40 is illustrated. In addition, while the user may use a plurality of the facilities 2, each facility management server 20 and each multifunction peripheral 64 installed in each facility 2 may have the functions described below. Thus, only one facility 2 is illustrated.

Figure 2:
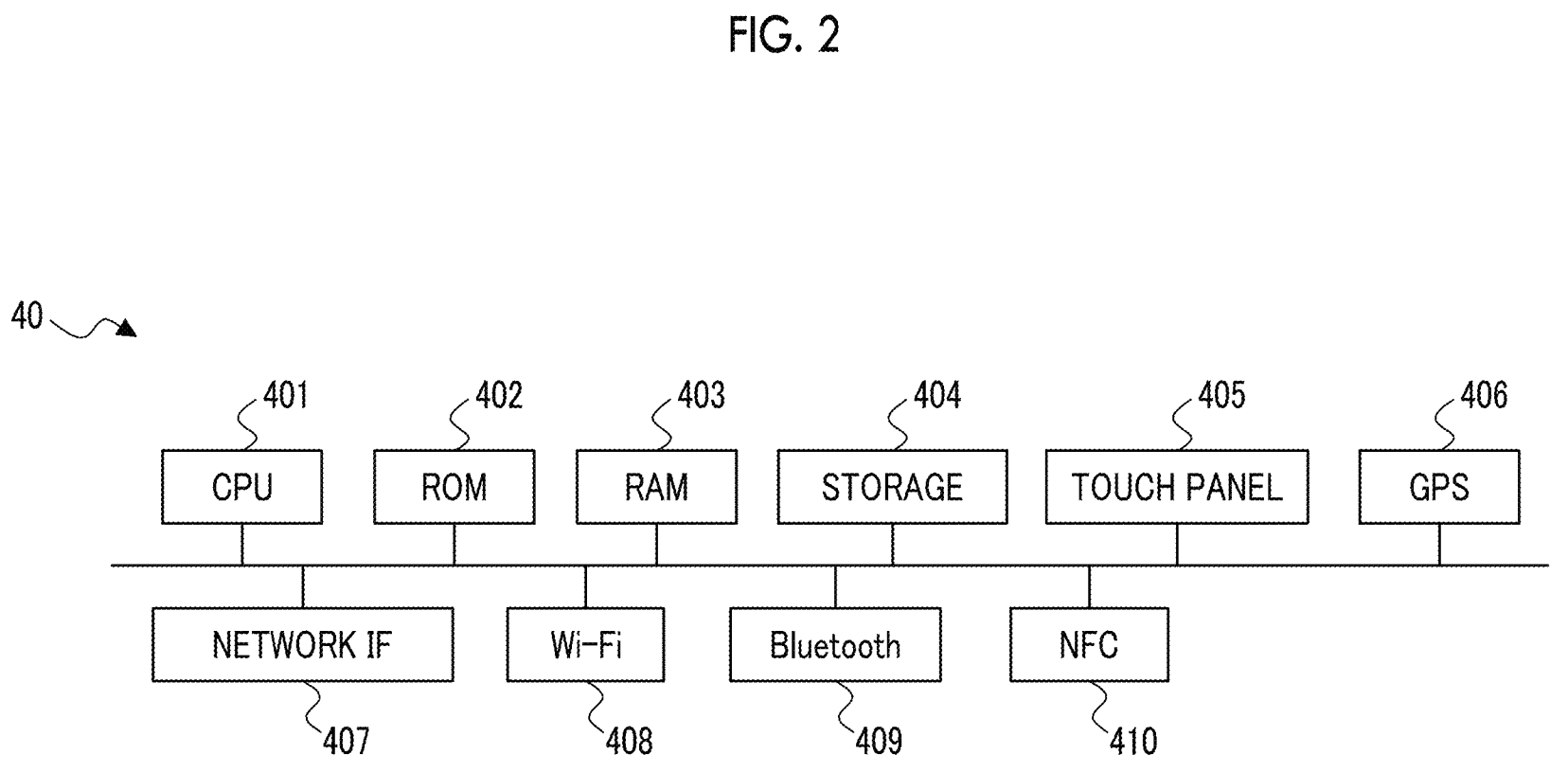

FIG. 2 is a hardware configuration diagram of the portable terminal apparatus 40 in the present exemplary embodiment. The portable terminal apparatus 40 is a terminal apparatus carried by the user, in which a computer is mounted. In the description of the present exemplary embodiment, while a smartphone is assumed as the portable terminal apparatus 40, the portable terminal apparatus 40 may be other portable terminal apparatuses such as a tablet terminal. The portable terminal apparatus 40 in the present exemplary embodiment can be implemented with a general-purpose hardware configuration that has already existed in the related art. That is, as illustrated in FIG. 2, the portable terminal apparatus 40 includes a CPU 401, a ROM 402, a RAM 403, a storage 404 as a memory that stores documents and various data, a touch panel 405 as a user interface that receives and displays information, a global positioning system (GPS) 406 as a position measurer, a network interface (IF) 407 as a communicator that performs communication via the network 4, a communication interface 408 for performing wireless communication using Wi-Fi, a communication interface 409 for performing short range wireless communication using Bluetooth (registered trademark), and a communication interface 410 for performing short range wireless communication with the wireless communication apparatuses installed in the gates 62. As described above, the portable terminal apparatus 40 in the present exemplary embodiment includes, as a wireless communicator, the interfaces 408, 409, and 410 for wirelessly connecting to the access points 24 using the communication standard called Wi-Fi, to the wireless communication apparatuses installed in the gates 62 using the communication standard called NFC, and to a wireless communication apparatus mounted in the multifunction peripheral 64 using the communication standard called Bluetooth, respectively.

The wireless communication apparatuses corresponding to NFC are incorporated in the gates 62. Thus, in a case where the gates 62 are mentioned in the following description, the gates 62 may indicate installation locations or indicate the wireless communication apparatuses.

Figure 3:
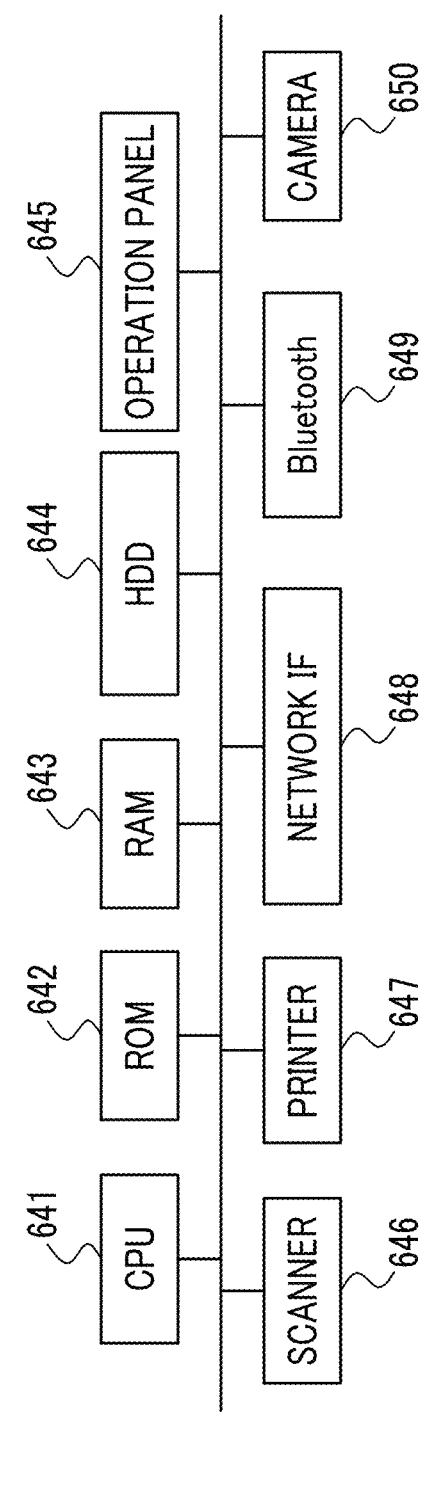
FIG. 3 is a hardware configuration diagram of a multifunction peripheral in the present exemplary embodiment.

FIG. 3 is a hardware configuration diagram of the multifunction peripheral 64 in the present exemplary embodiment. The multifunction peripheral 64 is a form of image forming apparatus in which various functions such as a printing function, a copy function, and a scanner function are mounted, and is an apparatus in which a computer is incorporated. As illustrated in FIG. 3, the multifunction peripheral 64 includes a CPU 641, a ROM 642, a RAM 643, a hard disk drive (HDD) 644 as a memory that stores a scanned document and the like, an operation panel 645 as a user interface that receives instructions from the user and displays information, a scanner 646 that scans an original document set by the user and accumulates the scanned original document in the HDD 644 as electronic data, a printer 647 that prints an image on an output paper sheet in accordance with an instruction from a control program executed by the CPU 641, a network interface (IF) 648 as a communicator that performs communication via the network 4, a communication interface 649 that causes the multifunction peripheral 64 to function as the wireless communication apparatus by performing short range wireless communication in accordance with the communication standard called Bluetooth, and a camera 650 as an imager.

Figure 4:
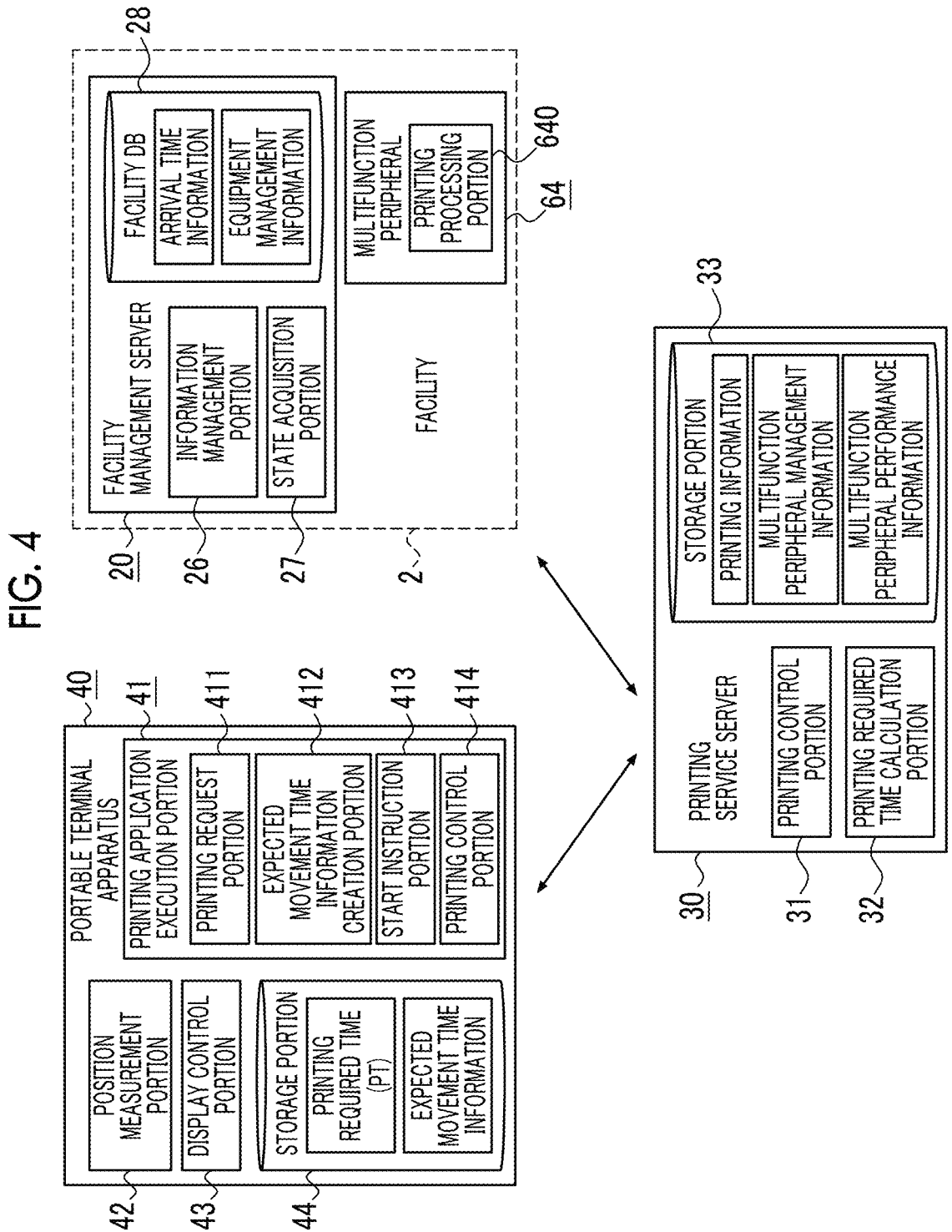
FIG. 4 is a block configuration diagram illustrating the printing service system in the present exemplary embodiment.

FIG. 4 is a block configuration diagram illustrating the printing service system in the present exemplary embodiment. The printing service system includes the multifunction peripheral 64 and the facility management server 20 installed in the facility 2, the printing service server 30, and the portable terminal apparatus 40.

The multifunction peripheral 64 includes a printing processing portion 640 performing printing in accordance with a printing instruction that is provided by the user operating the operation panel 645 and that is provided from the printing service server 30 via the network 4. Functions other than the functions described later among functions of the multifunction peripheral 64 in the present exemplary embodiment may be the same as in the related art.

The facility management server 20 manages information related to various types of equipment such as the access points 24, the gates 62, and the multifunction peripheral 64 installed in the facility 2. The facility management server 20 includes an information management portion 26, a state acquisition portion 27, and a facility database (DB) 28. Constituents not used in the description of the present exemplary embodiment are not illustrated in the drawings. The information management portion 26 manages various types of information stored in the facility database 28, such as registering, changing, deleting, and extracting data in the facility database 28 as requested, and provides information. The state acquisition portion 27 acquires a state of the multifunction peripheral 64. Information related to the acquired state is information to be referred to for more accurately calculating a time required for printing a document. For example, the information is information related to a state of operation of the multifunction peripheral 64, such as an in-operation state or a power-saving state, or information related to a load exerted on the multifunction peripheral 64, such as an execution state of a job.

At least movement time information and equipment management information are set and registered in the facility database 28. Data configurations of the movement time information and the equipment management information are illustrated in FIG. 5 and FIG. 6, respectively.

The movement time information indicates a required time (hereinafter, referred to as a "movement time") required for moving from a certain location to an installation position of the multifunction peripheral 64. In the present exemplary embodiment, the multifunction peripheral 64 is installed in only Shop 4 in the facility 2 as illustrated in FIG. 1. Thus, a numerical value, that is, the movement time, is set in only Shop 4 in the movement time information illustrated in FIG. 5. The setting example illustrated in FIG. 5 indicates that the movement time from wireless connection of the portable terminal apparatus 40 to the access point 24 (hereinafter, referred to as "WF1") referred to as "WF1" in FIG. 1 to arrival of the user at the position of the multifunction peripheral 64 is "120 seconds". Similarly, the setting example indicates that the movement time from wireless connection of the portable terminal apparatus 40 to the access point 24 (hereinafter, referred to as "WF2") referred to as "WF2" in FIG. 1 to arrival of the user at the position of the multifunction peripheral 64 is "90 seconds". Accordingly, in a case where the plurality of access points 24 are installed in the facility 2, the movement time of the user to the multifunction peripheral 64 varies, such as 120 seconds, 90 seconds, and 40 seconds depending on installation positions of the access points 24. Thus, in a case where the movement times from the access points 24 are mentioned without distinction, the movement times are denoted by a symbol "AT1".

In addition, the setting example indicates that the movement time from wireless connection of the portable terminal apparatus 40 to the gate 62 (hereinafter, referred to as "Gate 1") referred to as "Gate 1" in FIG. 1 to arrival of the user at the position of the multifunction peripheral 64 is "10 seconds". Similarly, the setting example indicates that the movement time from wireless connection of the portable terminal apparatus 40 to the gate 62 (hereinafter, referred to as "Gate 2") referred to as "Gate 2" in FIG. 1 to arrival of the user at the position of the multifunction peripheral 64 is "20 seconds". Accordingly, in a case where the plurality of gates 62 are provided in one store 6, the movement time of the user to the multifunction peripheral 64 varies, such as 10 seconds and 20 seconds, depending on installation positions of the gates 62. Thus, in a case where the movement times from the gates 62 are mentioned without distinction, the movement times are denoted by a symbol "AT2".

In addition, in a case where the portable terminal apparatus 40 carried by the user who has entered the store 6 further approaches the multifunction peripheral 64, the portable terminal apparatus 40 is wirelessly connected to the multifunction peripheral 64 using Bluetooth. The setting example of the movement time information illustrated in FIG. 5 indicates that the movement time from wireless connection of the portable terminal apparatus 40 to the multifunction peripheral 64 using Bluetooth to arrival of the user at the position of the multifunction peripheral 64 is "5 seconds". In the following description, the movement time after wireless connection using Bluetooth may be denoted by a symbol "AT3".

The camera 650 of the multifunction peripheral 64 is normally used for authenticating the user. In a case where the user further approaches the multifunction peripheral 64, the user is recognizably imaged by the camera 650. The setting example of the movement time information illustrated in FIG. 5 indicates that the movement time from recognition of the user by analyzing a captured image of the camera 650 to arrival of the user at the position of the multifunction peripheral 64 is "0 seconds". In the following description, the movement time after user recognition using the camera 650 may be denoted by a symbol "AT4".

While an estimated value of a time required for the user to move from each location to the installation position of the multifunction peripheral 64 is illustrated in the movement time information in FIG. 5, each movement time is in a relationship of $AT1 \geq AT2 \geq AT3 \geq AT4$ in terms of distances from the multifunction peripheral 64. Particularly, in the present exemplary embodiment, different movement times are obtained depending on a state of wireless connection between the wireless communication apparatuses (AT1, AT2, and AT3) for which different movement times are set and the portable terminal apparatus 40 carried by the user, by effectively using the plurality of wireless communication apparatuses (AT1, AT2, and AT3) fixedly installed at predetermined positions of different distances from the installation position of the multifunction peripheral 64. In each value of AT1 to AT4, the number of seconds regarded as being valid considering layouts of the facility 2 and the stores 6, arrangement of products and shelves, customer flow, and the like is set by a facility manager, a store manager, or the like.

Information related to various types of equipment installed in the facility 2 is set in the equipment management information. In the equipment management information, "location", "equipment name", and "unique information" are set in association with each other as illustrated in FIG. 6. Here, "location" is information indicating a location in which the equipment is installed. In addition, "equipment name" is a name indicating the equipment. In addition, "unique information" is information that is unique to the equipment and can be used to identify the equipment. For example, for the access points 24, the equipment name and a service set identifier (SSID) can be used as the unique information. For the multifunction peripheral 64, the equipment name, a manufacturing number, and the like can be used as the unique information. For the gates 62, a gate name and apparatus IDs of the wireless communication apparatuses linked to the gates 62 can be used as the unique information.

In addition, at least the unique information of the multifunction peripheral 64 includes positional information (for example, latitude and longitude information) for specifying the installation position of the multifunction peripheral 64. Other types of equipment may also have the positional information.

Each of the constituents 26 and 27 in the facility management server 20 is implemented by a cooperative operation between a computer forming the facility management server 20 and a program operated by a CPU mounted in the computer. In addition, the facility database 28 is implemented by an HDD mounted in the facility management server 20. Alternatively, a RAM may be used, or an external memory may be used via a network.

The printing service server 30 is a server computer used for providing the printing service to the user. The server computer can be implemented by the same hardware configuration as in the related art. The printing service server 30 includes a printing control portion 31, a printing required time calculation portion 32, and a storage portion 33. Constituents not used in the description of the present exemplary embodiment are not illustrated in the drawings.

The printing control portion 31 performs transmission and reception of information such as output of the printing instruction to the multifunction peripheral 64, a printing control in the printing service, and the like in accordance with requests from the user. The printing required time calculation portion 32 calculates, as a "printing required time", an estimated value of a time required in a case of printing a document to be printed in accordance with a printing request from the user using a designated multifunction peripheral 64. At least the multifunction peripheral management information and the multifunction peripheral performance information are set and registered in the storage portion 33. Data configurations of the multifunction peripheral management information and the multifunction peripheral performance information are illustrated in FIG. 7 and FIG. 8, respectively.

Information related to all multifunction peripherals to be managed is set in the multifunction peripheral management information. The multifunction peripheral management information includes each item of "multifunction peripheral", "BT", "facility", and "store". Here, "multifunction peripheral" is information for specifying a multifunction peripheral to be managed and includes the equipment name, the unique information, and a mode of the multifunction peripheral. In addition, "BT" is information that can be used to identify a wireless communication apparatus with which wireless communication is performed using the Bluetooth standard implemented in the multifunction peripheral. For example, the apparatus ID is set. In addition, "facility" is information for specifying a facility in which the multifunction peripheral is installed. In addition, "store" is information for specifying a store in which the multifunction peripheral is installed.

Information indicating performance of the multifunction peripheral is set for each model in the multifunction peripheral performance information. In the multifunction peripheral performance information, a model of the multifunction peripheral and information indicating performance of the model are associated with each other. Since the printing required time also depends on the performance of the multifunction peripheral, the printing required time calculation portion 32 calculates the printing required time by referring to the multifunction peripheral performance information.

Each of the constituents 31 and 32 in the printing service server 30 is implemented by a cooperative operation between a computer forming the printing service server 30 and a program operated by a CPU mounted in the computer. In addition, the storage portion 33 is implemented by an HDD mounted in the printing service server 30. Alternatively, a RAM may be used, or an external memory may be used via a network.

The portable terminal apparatus 40 includes a printing application execution portion 41, a position measurement portion 42, a display control portion 43, and a storage portion 44. Constituents not used in the description of the present exemplary embodiment are not illustrated in the drawings. The printing application execution portion 41 executes an application for using the printing service provided by the printing service server 30. The printing application execution portion 41 includes a printing request portion 411, an expected movement time information creation portion 412, a start instruction portion 413, and a printing control portion 414. The printing request portion 411 requests the printing service server 30 to print a document. The expected movement time information creation portion 412 creates expected movement time information including a movement time (hereinafter, "expected movement time") that is expected to be required for the user of the portable terminal apparatus 40 to arrive at the installation position of the multifunction peripheral 64 for executing printing from a current position, and registers the expected movement time information in the storage portion 44. The start instruction portion 413 provides a printing execution start instruction at a point in time when the expected movement time becomes less than or equal to the printing required time. The printing control portion 414 performs a control related to printing processing in the portable terminal apparatus 40.

The position measurement portion 42 acquires the current position of the user in an outdoor space, that is, outside the facility 2, in cooperation with the GPS 406. The display control portion 43 controls display of the touch panel 405. The storage portion 44 stores the printing required time and the movement time information. These information will be described together with operation description.

Each of the constituents 41 to 43 in the portable terminal apparatus 40 is implemented by a cooperative operation between the computer forming the portable terminal apparatus 40 and a program operated by the CPU 401 mounted in the computer. In addition, the storage portion 44 is implemented by the storage 404 mounted in the portable terminal apparatus 40. Alternatively, the RAM 403 may be used, or an external memory may be used via a network.

Next, an operation in the present exemplary embodiment will be described.

First, an assumption that the user of the portable terminal apparatus 40 intends to use the multifunction peripheral 64 installed in the facility 2 for printing a document and is outside the facility 2 in requesting printing of the document is made. Hereinafter, processing until the user requests printing and obtains a printed matter will be described using the sequence diagram illustrated in FIG. 9.

First, the user operates the portable terminal apparatus 40 to start the application of the printing service, thereby causing the printing application execution portion 41 to execute processing. In a case where the printing application execution portion 41 is started, the printing application execution portion 41 displays a printing request screen on the touch panel 405.

Figure 10:
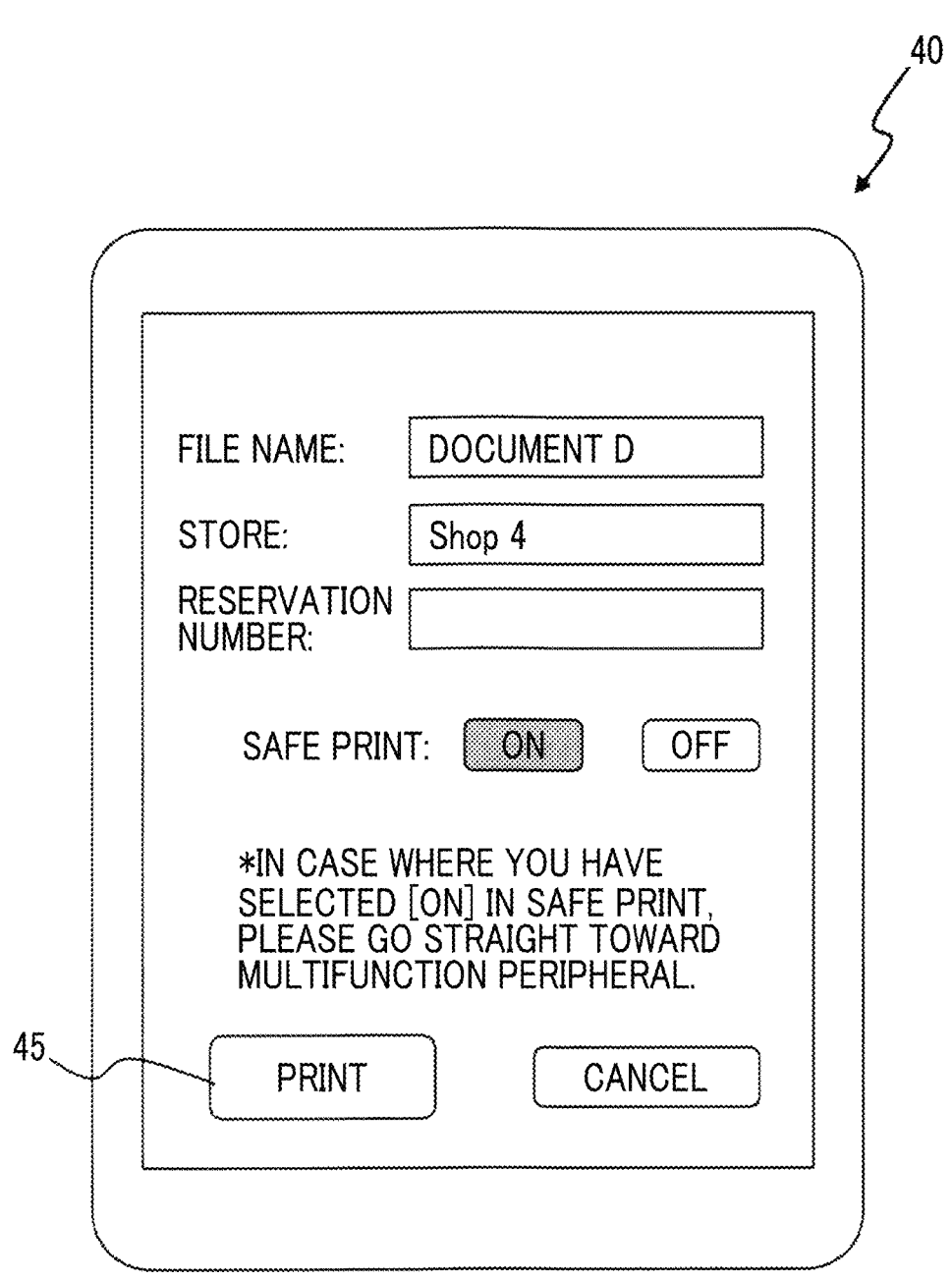
FIG. 10 is a diagram illustrating a display example of a printing request screen in the present exemplary embodiment.

FIG. 10 is a diagram illustrating a display example of the printing request screen in the present exemplary embodiment. The user inputs a file name of the document to be printed and the store 6 in which the multifunction peripheral 64 to be used for printing is installed, from the printing request screen. In a case where the document to be printed is uploaded to the printing service server 30 in advance, and a reservation number is acquired, the reservation number may be input instead of the file name.

A designation of "store" from the printing request screen is information for specifying the multifunction peripheral 64. In a case where a plurality of the multifunction peripherals 64 are installed in the store 6, the installed multifunction peripherals 64 may be displayed in a list, and the user may select the multifunction peripheral 64. Alternatively, a designation from the user may be restricted to the designation of the store 6, and which multifunction peripheral 64 is to be used by the user may be processed by causing the printing service server 30 or the facility management server 20 to select the multifunction peripheral 64 by referring to a load state, performance, and the like of the multifunction peripheral 64.

As described above, in the present exemplary embodiment, for convenience, the user designates the store 6 in order to specify the multifunction peripheral 64 to be used for printing. However, the user interface is not necessarily limited thereto. For example, the facilities 2 in which the printing service can be used may be displayed in a list, and the user may select the facility 2 from the printing request screen. Furthermore, the stores 6 in which the multifunction peripherals 64 are installed in the selected facility 2 may be displayed in a list, and the user may select the store 6.

In order to display the lists of the facilities 2 and the stores 6, the printing application execution portion 41 may download and display the printing request screen from the printing service server 30 or may acquire the lists of the facilities 2 and the stores 6 from the printing service server 30 in displaying the printing request screen stored inside the printing application execution portion 41. The printing service server 30 can provide the lists of the facilities 2 and the stores 6 to the printing application execution portion 41 by referring to the multifunction peripheral management information.

In addition, "safe print" illustrated on the printing request screen is a characteristic printing service in the present exemplary embodiment and specifically, refers to a service for finishing printing of the document for which the printing request is made, at a point in time when the user arrives at the installation position of the multifunction peripheral 64. The printed matter is not taken or seen by a third party by using the safe print. Thus, the user is safe. In a case of intending to use the safe print, the user selects an "ON" button on the printing request screen. In a case where the user selects an "OFF" button, the user can obtain the printed matter by operating the operation panel 645 of the multifunction peripheral 64 as in the related art. Alternatively, there is a possibility of a state where the printed matter is left in a discharge tray because printing is executed and finished regardless of arrival of the user. In the description of the present exemplary embodiment, the "ON" button is selected, and the multifunction peripheral 64 installed in Shop 4 is designated as a multifunction peripheral to be used for printing a document D.

In a case where the user designates necessary items from the printing request screen and then, selects a "printing" button 45, the printing request portion 411 transmits the printing request to the printing service server 30 (step S410). The printing request includes the store 6 designated from the printing request screen, a document file, and furthermore, a user name as identification information of the user of the portable terminal apparatus 40. Since the printing service provides service to a user subjected to user registration in advance, the application of the printing service may acquire and transmit the user name stored inside the application. In addition, while the document file is transmitted at a time of the printing request in the present exemplary embodiment, the document file may be registered in the printing service server 30 in advance. In this case, the file name or the reservation number for specifying the registered document may be transmitted. Alternatively, the document file may be transmitted in accordance with the printing start instruction described later. However, in this case, information such as a size of the file and a printing attribute necessary for calculating the printing required time needs to be transmitted together with the printing request.

In a case where the printing request is transmitted from the portable terminal apparatus 40, the printing control portion 31 in the printing service server 30 designates the store 6 designated by the printing request and requests the facility management server 20 of the facility 2 having the store 6 to provide information necessary for calculating the required time (step S310).

The state acquisition portion 27 in the facility management server 20 makes an inquiry about a current state to the multifunction peripheral 64 installed in the store 6 in response to the request from the printing service server 30 (step S210).

The multifunction peripheral 64 collects the current state in response to the inquiry from the facility management server 20 (step S6401). As described above, the current state is, for example, information related to the state of operation or the load of the multifunction peripheral 64 and is information used for calculating the printing required time. The multifunction peripheral 64 provides the collected information to the facility management server 20 as state information (step S6402).

In a case where the state acquisition portion 27 acquires the state information from the multifunction peripheral 64, the information management portion 26 extracts the movement time information of Shop 4 corresponding to the multifunction peripheral 64 and the equipment management information of the facility 2 in which Shop 4 is present, from the facility database 28 (step S220) and provides the movement time information and the equipment management information to the printing service server 30 together with the state information acquired from the multifunction peripheral 64 (step S230).

Next, the printing required time calculation portion 32 calculates the printing required time of the document D to be printed in the selected multifunction peripheral 64 in accordance with an instruction from the printing control portion 31 (step S320). The printing required time is calculated by referring to information related to the document and information related to the multifunction peripheral 64. For example, the information related to the document is printing setting information including attribute information of the document such as a size of the document D, color/grayscale, a paper sheet size, and the number of copies. The information related to the multifunction peripheral 64 is the performance, the state information, and the like of the multifunction peripheral 64. Particularly, in a case where the state information of the multifunction peripheral 64 is referred to, the printing required time is calculated by further considering a recovery time from the power-saving state to an operable state in a case where the multifunction peripheral 64 is in the power-saving state. Obviously, as a load (a size, high quality, and the like) exerted on the printing of the document D is increased, and as the performance of the multifunction peripheral 64 is decreased, the printing required time tends to be increased.

In a case where a plurality of the multifunction peripherals 64 are installed in the store 6, the printing control portion 31 may select the multifunction peripheral 64 to be used for printing the document by referring to the state information or the multifunction peripheral performance information of the multifunction peripheral 64.

Next, the printing control portion 31 provides information about the calculated printing required time, and the movement time information and the equipment management information acquired from the facility management server 20 to the portable terminal apparatus 40 (step S330).

In a case where the portable terminal apparatus 40 acquires the printing required time required for printing the document D in response to the printing request, the portable terminal apparatus 40 stores the printing required time in the storage portion 44. In addition, in a case where the expected movement time information creation portion 412 in the portable terminal apparatus 40 acquires the acquired movement time information and the equipment management information, the expected movement time information creation portion 412 creates the expected movement time information and registers the expected movement time information in the storage portion 44.

FIG. 11 is a diagram illustrating an example of a data configuration of the expected movement time information stored in the storage portion 44 in the present exemplary embodiment. The expected movement time information is configured with items of "detection equipment" and "expected movement time" as a set. Here, "detection equipment" is information related to equipment that detects the user, and includes the equipment name of the equipment that has detected the user, and the unique information of the equipment. In addition, "expected movement time" includes the movement time to the installation position of the multifunction peripheral 64 after the user is detected by the equipment, and a symbol denoting the movement time for convenience. The expected movement time information is created by extracting item data from the acquired movement time information and the equipment management information.

The expected movement time information also includes a symbol "AT0" denoting the movement time from the current position of the user specified by position measurement using the GPS 406 to the installation position of the multifunction peripheral 64. A value of AT0 changes in accordance with movement of the user and thus, is set to be blank in the expected movement time information.

While the expected movement time information is created from the movement time information and the equipment management information in the present exemplary embodiment, the acquired movement time information and the equipment management information may be simply stored. While illustration is not provided in the storage portion 44 illustrated in FIG. 4 and in FIG. 11, the unique information of the multifunction peripheral 64 is stored in the storage portion 44.

Figure 12A:
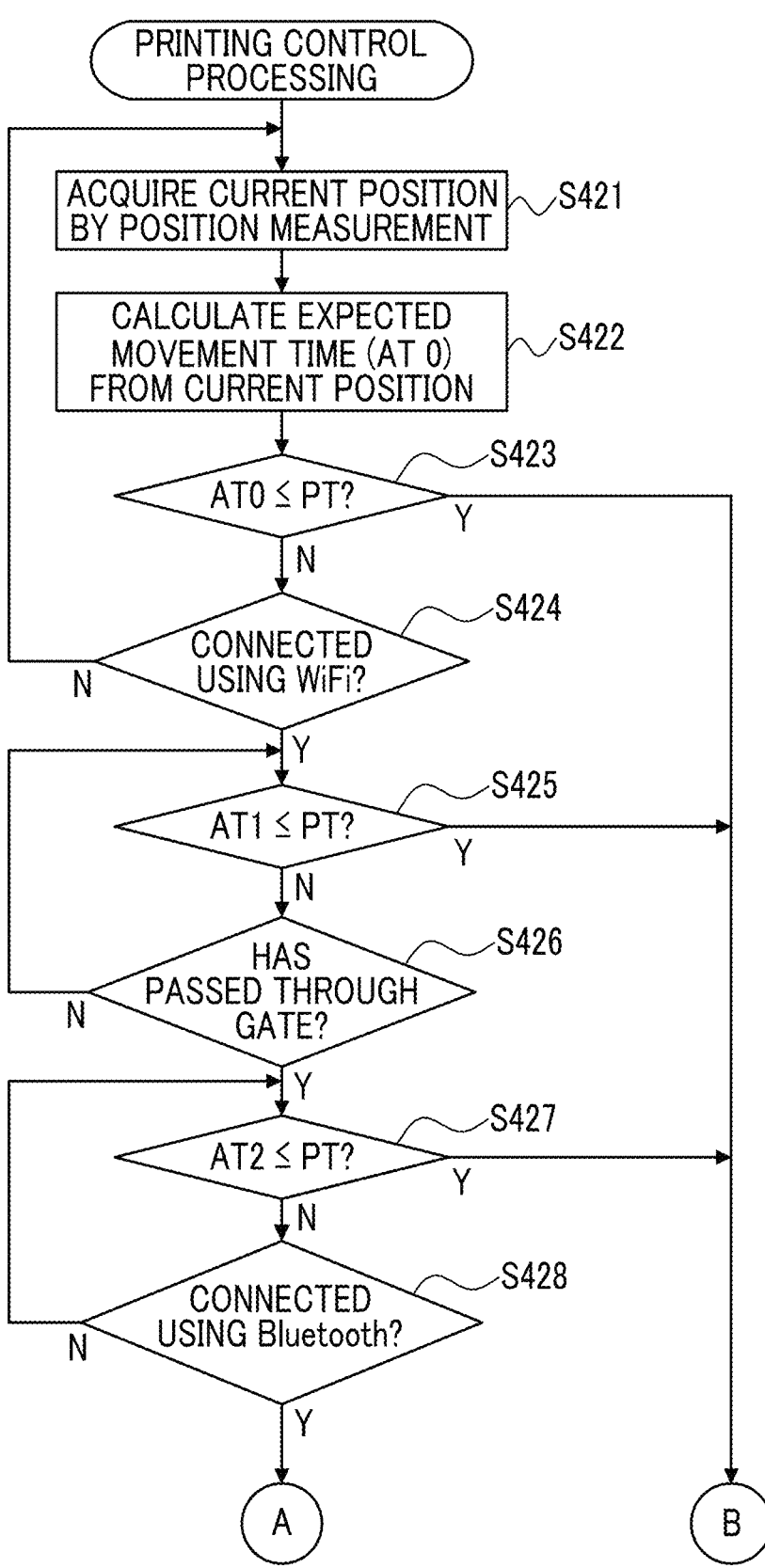
FIG. 12A is a flowchart illustrating printing control processing in the present exemplary embodiment.
Figure 12B:
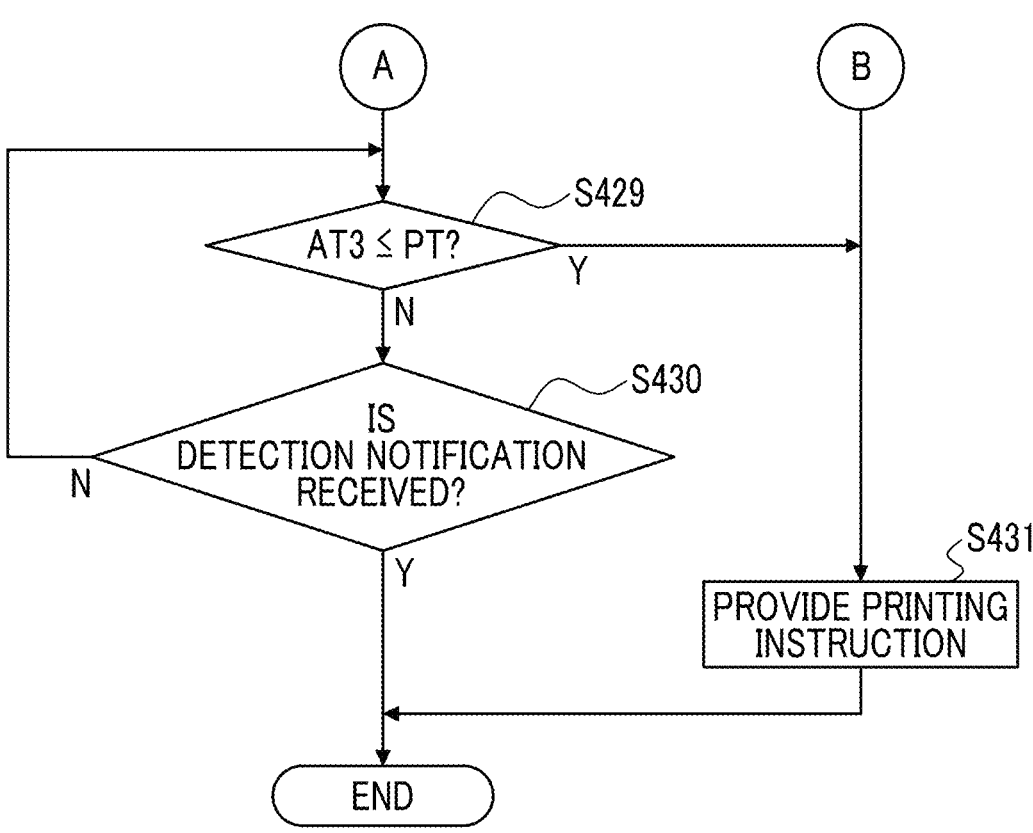
FIG. 12B is a flowchart continued from FIG. 12A.

Next, the printing application execution portion 41 executes printing control processing (step S420). Hereinafter, characteristic printing control processing in the present exemplary embodiment will be described using the flowcharts illustrated in FIG. 12A and FIG. 12B.

As described above, the user is outside the facility 2 at a point in time when the printing request is made. As the printing request is made by designating the safe print, the user moves toward the facility 2 in which the multifunction peripheral 64 is installed. An assumption that means of movement is only walking is made for convenience of description. The position measurement portion 42 acquires the current position of the moving user (step S421). Since the user carries the portable terminal apparatus 40 at all times, the position measured by the position measurement portion 42 of the portable terminal apparatus 40 is equivalent to the current position of the user.

Next, the printing control portion 414 calculates the movement time (AT0) from the current position of the user to the installation position of the multifunction peripheral 64 based on the current position of the user and the position of the multifunction peripheral 64 (step S422). Here, in a case where the movement time AT0 is not less than or equal to the printing required time (denoted by a symbol "PT") (N in step S423), that is, in a case where a time required for movement is longer than a time required for printing, starting printing of the document D at the current point in time causes printing to be finished before the user arrives at the multifunction peripheral 64. Accordingly, printing is not executed.

On the other hand, in a case where the movement time AT0 becomes less than or equal to the printing required time PT (Y in step S423), printing is finished in a case where the user arrives at the multifunction peripheral 64, and the user may obtain the printed matter without waiting. Accordingly, the start instruction portion 413 instructs the printing service server 30 to start execution of printing of the document D at a point in time when the movement time AT0 becomes less than or equal to the printing required time PT (step S431).

Figure 9:
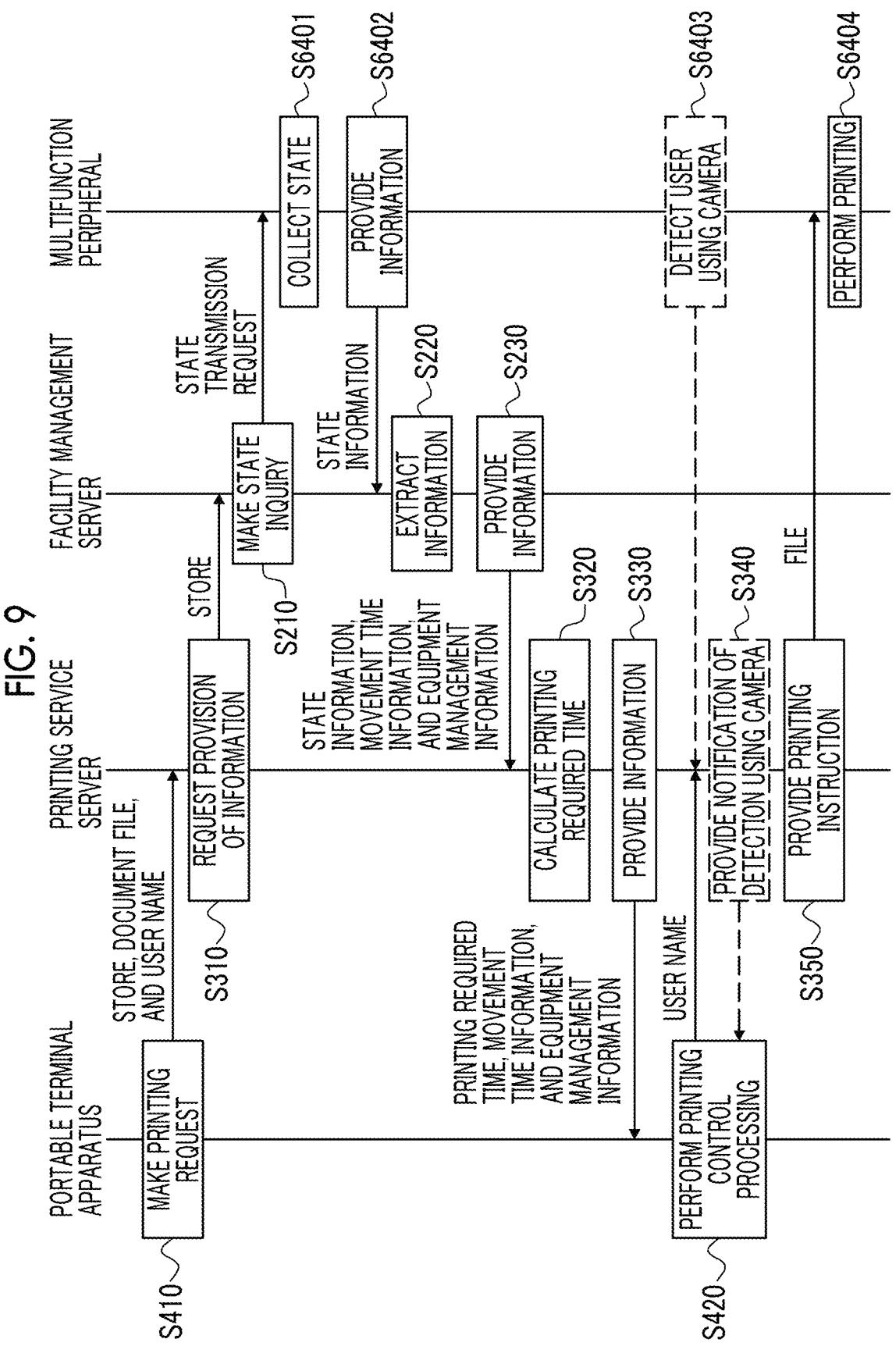
FIG. 9 is a sequence diagram illustrating processing until a user provides a printing instruction to obtain a printed matter in the present exemplary embodiment.

The printing control portion 31 in the printing service server 30 transmits a file of the document D to the multifunction peripheral 64 and outputs the printing instruction of the document D in accordance with the printing execution start instruction from the portable terminal apparatus 40 (step S350 in FIG. 9). The printing processing portion 640 in the multifunction peripheral 64 prints the document D in accordance with the printing instruction from the printing service server 30 (step S6404 in FIG. 9).

Accordingly, printing is finished at a point in time when the user arrives at the multifunction peripheral 64, and the printed matter may be obtained without waiting.

In a case where the movement time AT0 is not less than or equal to the printing required time PT (N in step S423), the printing control portion 414 returns to step S421 and repeats the position measurement until the portable terminal apparatus 40 is wirelessly connected to the access points 24 installed in the facility 2 (N in step S424). While printing is started in a case where the movement time AT0 becomes less than or equal to the printing required time PT, printing is finished as the value of the movement time AT0 is closer to the printing required time PT, that is, in a case where the user has approached the multifunction peripheral 64. Accordingly, for example, providing the printing execution start instruction at a point in time when the movement time AT0 becomes equal to the printing required time PT is desired. In this case, printing is finished at the same time as when the user arrives at the position of the multifunction peripheral 64. In order to finish printing at the same time as the arrival of the user, for example, detecting a timing at which the movement time AT0 is equal to the printing required time PT is desired. Thus, for example, repeating the measurement of the position of the user in very short cycles is desired. The same applies to a case of repeating processing (steps S425, S427, and S429) of comparing the movement times AT1 to AT3 with the printing required time PT, described later.

The movement time AT0 of the user can be calculated by dividing a movement distance from the current position of the user to the multifunction peripheral 64 by a movement speed of the user. The installation position of the multifunction peripheral 64 is stored in the storage portion 44. Thus, the movement distance can be calculated each time the position measurement is performed. The movement speed can be calculated using a transition of the current position (that is, the movement distance) and an elapsed time. Even in a case where the user is using means of movement (a vehicle and the like) other than walking, the movement speed can be estimated. In addition, a walking speed of the user may be calculated from record information of movement and stored.

In a case where the user walks toward the facility 2, the user eventually arrives at the facility 2. In a case where the user enters the facility 2 from the entrance 22, the portable terminal apparatus 40 is eventually wirelessly connected to the access point 24 closest to the entrance 22.

In a case where wireless connection is made to the access point 24 before the movement time AT0 becomes less than or equal to the printing required time PT (Y in step S424), the printing control portion 414 acquires the expected movement time AT1 that can be specified from the unique information of the connected access point 24, as a first movement required time by referring to the expected movement time information. Then, the printing control portion 414 uses the expected movement time AT1 as a movement time to be compared with the printing required time PT instead of the movement time AT0.

In the present exemplary embodiment, the portable terminal apparatus 40 collectively acquires and stores each movement time (AT1 to AT4) in the provision of the information in step S330. However, for example, since the movement time AT1 is information that is necessary only after wireless connection is made to the access point 24, the movement time AT1 may be processed to be acquired from the printing service server 30 at a point in time when wireless connection is made to the access point 24. The same applies to other movement times (AT2 to AT3).

In addition, the movement time AT1 is a movement time from the installation position of the access point 24 to the multifunction peripheral 64. The portable terminal apparatus 40 may be wirelessly connected at a position slightly away from the access point 24 in a strict sense. However, in the present exemplary embodiment, the portable terminal apparatus 40 is described as being wirelessly connected at the installation position of the access point 24 for convenience. In a case where the access point 24 having a function with which a distance and a direction from the wirelessly connected portable terminal apparatus 40 can be detected is used, the movement time can be more accurately obtained.

In a case where the expected movement time AT1 is not less than or equal to the printing required time PT (N in step S425), starting printing of the document D at the current point in time causes printing to be finished before the user arrives at the multifunction peripheral 64. Accordingly, printing is not executed.

On the other hand, in a case where the expected movement time AT1 becomes less than or equal to the printing required time PT (Y in step S425), printing is finished in a case where the user arrives at the multifunction peripheral 64, and the user may obtain the printed matter without waiting. Accordingly, the start instruction portion 413 instructs the printing service server 30 to start execution of printing of the document D at a point in time when the expected movement time AT1 becomes less than or equal to the printing required time PT (step S431). A series of processing in which the printing service server 30 provides the printing instruction of the document D to the multifunction peripheral 64 in accordance with the printing execution start instruction from the portable terminal apparatus 40, and in which the multifunction peripheral 64 prints the document D in accordance with the printing instruction from the printing service server 30 is the same as the processing in a case of comparing the movement time AT0 with the printing required time PT and thus, will not be described. The same applies to the processing in a case where wireless connection is made to the gate 62 and Bluetooth described below. Thus, the processing after the start instruction portion 413 provides the printing execution start instruction will not be described.

In a case where the expected movement time AT1 is not less than or equal to the printing required time PT (N in step S425), the printing control portion 414 returns to step S425 and executes the processing of comparing the expected movement time AT1 with the printing required time PT until the portable terminal apparatus 40 is wirelessly connected to the gate 62 of Shop 4 (N in step S426).

The user continues moving to the store 6 in which the target multifunction peripheral 64 is installed, even after the portable terminal apparatus 40 is wirelessly connected to the access point 24 by arriving at the facility 2. In a case where the user arrives at the store 6, the user holds the portable terminal apparatus 40 to the gate 62. Accordingly, the portable terminal apparatus 40 is wirelessly connected to the gate 62. Accordingly, passage of the user through the gate 62 is checked. The wireless communication apparatus scans the identification information of the user recorded in the portable terminal apparatus 40. Thus, the facility management server 20 can specify the user who has entered.

In a case where wireless connection is made to the gate 62 before the expected movement time AT1 becomes less than or equal to the printing required time PT (Y in step S426), the printing control portion 414 acquires the expected movement time AT2 that can be specified from the unique information of the passed gate 62, as a second movement required time by referring to the expected movement time information. The printing control portion 414 uses the expected movement time AT2 as a movement time to be compared with the printing required time PT instead of the expected movement time AT1.

In the present exemplary embodiment, a hierarchy of a two-stage configuration in which the wireless communication apparatuses installed in the facility 2 separately from the wireless communication apparatus of the multifunction peripheral 64 are installed in the access points 24 and the gates 62 is provided. Thus, the expected movement time AT2 is acquired as the second movement required time. However, in a case where the access points 24 are not installed, the expected movement time AT2 is acquired as the first movement required time.

In a case where the expected movement time AT2 is not less than or equal to the printing required time PT (N in step S427), starting printing of the document D at the current point in time causes printing to be finished before the user arrives at the multifunction peripheral 64. Accordingly, printing is not executed.

On the other hand, in a case where the expected movement time AT2 becomes less than or equal to the printing required time PT (Y in step S427), printing is finished in a case where the user arrives at the multifunction peripheral 64, and the user may obtain the printed matter without waiting. Accordingly, the start instruction portion 413 instructs the printing service server 30 to start execution of printing of the document D at a point in time when the expected movement time AT2 becomes less than or equal to the printing required time PT (step S431).

In a case where the expected movement time AT2 is not less than or equal to the printing required time PT (N in step S427), the printing control portion 414 returns to step S427 and executes the processing of comparing the expected movement time AT2 with the printing required time PT until the portable terminal apparatus 40 is wirelessly connected to the multifunction peripheral 64 using Bluetooth (N in step S428).

In a case where wireless connection is made to the multifunction peripheral 64 using Bluetooth before the expected movement time AT2 becomes less than or equal to the printing required time PT (Y in step S428), the printing control portion 414 acquires the expected movement time AT3 corresponding to Bluetooth as a third movement required time by referring to the expected movement time information. The printing control portion 414 uses the expected movement time AT3 as a movement time to be compared with the printing required time PT instead of the expected movement time AT2.

In a case where the expected movement time AT3 is not less than or equal to the printing required time PT (N in step S429), starting printing of the document D at the current point in time causes printing to be finished before the user arrives at the multifunction peripheral 64. Accordingly, printing is not executed.

On the other hand, in a case where the expected movement time AT3 becomes less than or equal to the printing required time PT (Y in step S429), printing is finished in a case where the user arrives at the multifunction peripheral 64, and the user may obtain the printed matter without waiting. Accordingly, the start instruction portion 413 instructs the printing service server 30 to start execution of printing of the document D at a point in time when the expected movement time AT3 becomes less than or equal to the printing required time PT (step S431).

In a case where the expected movement time AT3 is not less than or equal to the printing required time PT (N in step S429), the printing control portion 414 returns to step S429 and executes the processing of comparing the expected movement time AT3 with the printing required time PT until a notification indicating that the user of the portable terminal apparatus 40 is detected by the camera 650 of the multifunction peripheral 64 is received (N in step S430).

While the printing control based on a relationship of wireless connection between the portable terminal apparatus 40 and the wireless communication apparatus is described above, a printing execution control is further performed using the camera 650 of the multifunction peripheral 64 in the present exemplary embodiment. This processing is illustrated in FIG. 9.

The camera 650 in the multifunction peripheral 64 images the user standing in front of the multifunction peripheral 64. The multifunction peripheral 64 authenticates the user who intends to start using the multifunction peripheral 64, by comparing the captured image with a face image of the user registered in advance. In the present exemplary embodiment, the camera 650 of the multifunction peripheral 64 is used for the printing control.

That is, the multifunction peripheral 64 checks whether or not the user who has made the printing request is in front of the multifunction peripheral 64, by analyzing the image captured by the camera 650. The user who has requested printing of the document D is a normal user and registers the face image in advance.

Here, in a case where the user who has requested printing of the document D is detected from the captured image of the camera 650, the multifunction peripheral 64 notifies the printing service server 30 of the detection of the user (step S6403). The printing control portion 31 in the printing service server 30 notifies the portable terminal apparatus 40 that the user is detected by the camera 650 (step S340). The printing control portion 31 outputs the printing instruction to the multifunction peripheral 64 in response to the detection of the user by the camera 650 even in a case where the printing instruction from the portable terminal apparatus 40 is not received (step S350).

In a case where the expected movement time AT3 is not less than or equal to the printing required time PT (N in step S429), and the printing control portion 414 in the portable terminal apparatus 40 receives the notification indicating that the user of the portable terminal apparatus 40 is detected by the camera 650 of the multifunction peripheral 64 (Y in step S430), the printing control portion 414 finishes the processing. Since the printing instruction with respect to the multifunction peripheral 64 has already been provided by the printing control portion 31 in the printing service server 30 in accordance with the detection of the user by the camera 650, the printing instruction is not provided by the portable terminal apparatus 40.

According to the present exemplary embodiment, the current position of the user is perceived based on not only wireless connection between the portable terminal apparatus 40 and the multifunction peripheral 64 but also wireless connection between the portable terminal apparatus 40 and the wireless communication apparatus fixedly installed at a position away from the multifunction peripheral 64. In addition, printing is controlled such that printing is finished at a point in time when the user arrives at the installation position of the multifunction peripheral 64, by comparing the movement time from the current position with the printing required time. In a case where, for example, the size of the document D is large, starting execution of printing after arriving at the facility 2 results in a possibility that printing is not finished until the user arrives at the multifunction peripheral 64. In order to deal with such a case, execution of printing can be started even in a case where the user is outside the facility 2, by cooperating with the GPS 406 in the present exemplary embodiment.

On the other hand, in a case where the user is in front of the multifunction peripheral 64, printing can be immediately started by using the camera 650 of the multifunction peripheral 64. This is convenient in a case where the document to be printed has a small number of pages such as one page. While the camera 650 mounted in the multifunction peripheral 64 is used as the imager, a monitoring camera installed in the facility 2 may also be used. In addition, the monitoring camera may be used instead of the wireless communication apparatus or together with the wireless communication apparatus.

The movement time included in the movement time information stored and managed by the facility management server 20 is an estimated value of the movement time that does not depend on a specific user. User characteristics such as an age, a sex, and the like of the user who uses the portable terminal apparatus 40 can be specified. In addition, in a case where movement records in the past are set to be accumulated, the walking speed of the user can be more accurately obtained. Thus, the movement time can also be more accurately calculated. Accordingly, the portable terminal apparatus 40 may correct the movement time stored and monitored by the facility management server 20 in accordance with the characteristics of the user and register the movement time in the expected movement time information, and use the movement time as the expected movement time (AT0 to AT4) to be used for the printing control.

In addition, as described above, the movement time may vary depending on the user. On the other hand, the movement distance is easily handled as a constant value independently of the characteristics of the user. Accordingly, while the movement time is stored in the facility management server 20 in the present exemplary embodiment, the time may be processed to be converted into a distance instead to decide a timing at which the printing start instruction is provided.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.
Supplementary Note
(((1)))
    A portable terminal apparatus comprising:
    a processor; and
    a wireless communicator,
    wherein the processor is configured to:
        acquire a printing required time required for printing a
            file;
        while a user carrying the portable terminal apparatus is
            moving to a printing apparatus to be used for printing
            the file, acquire a first movement required time as a
            movement time of the user required for arriving at
            the printing apparatus from a wireless communica-
            tion apparatus that is wirelessly connected to the
            wireless communicator and that is installed sepa-
            rately from the printing apparatus; and
        in a case where the wireless communicator is wirelessly
            connected to the wireless communication apparatus,
            perform a control of instructing the printing appara-
            tus to print the file at a point in time when the first
            movement required time becomes less than or equal
            to the printing required time.

(((2)))
    The portable terminal apparatus according to (((1))),
    wherein the wireless communication apparatus is
        installed at a predetermined position in a facility in
        which the printing apparatus is installed.
(((3)))
    The portable terminal apparatus according to (((2))),
wherein the processor is configured to:
    in a case where the wireless communication apparatus is
        further installed at an entrance of a section that is
        provided in the facility and in which the printing
        apparatus is installed, acquire a second movement
        required time as a movement time of the user required
        for arriving at the printing apparatus from the wireless
        communication apparatus installed at the entrance of
        the section, and
    in a case where the wireless communicator is wirelessly
        connected to the wireless communication apparatus
        installed at the entrance of the section before the first
        movement required time becomes less than or equal to
        the printing required time, perform a control of
        instructing the printing apparatus to print the file at a
        point in time when the second movement required time
        becomes less than or equal to the printing required time
        instead of the first movement required time.
(((4)))
    The portable terminal apparatus according to (((2))),
wherein the processor is configured to:
    acquire a third movement required time as a movement
        time of the user required for arriving at the printing
        apparatus from a position at which the wireless com-
        municator is wirelessly connected to a short range
        wireless communication apparatus mounted in the
        printing apparatus, and
    in a case where the wireless communicator is wirelessly
        connected to the short range wireless communication
        apparatus before the first movement required time
        becomes less than or equal to the printing required
        time, perform a control of instructing the printing
        apparatus to print the file at a point in time when the
        third movement required time becomes less than or
        equal to the printing required time instead of the first
        movement required time.
(((5)))
    The portable terminal apparatus according to (((1))),
further comprising:
    a position measurer,
    wherein the processor is configured to:
        while the user is moving to the printing apparatus, and
            the wireless communicator is not wirelessly con-
            nected to the wireless communication apparatus,
            estimate a movement time of the user required for
            arriving at the printing apparatus based on a current
            position of the user specified by the position mea-
            surer.
(((6)))
    A printing service system comprising:
    the portable terminal apparatus according to (((1)));
    a service server;
    a printing apparatus; and
    a wireless communication apparatus installed separately
        from the printing apparatus,
    wherein a processor provided in the service server is
        configured to:
        in a case where a file to be printed is acquired from the
            portable terminal apparatus, calculate a printing
            required time required for printing the file by refer-
            ring to information related to the printing apparatus and attribute information of the file and provide the printing required time to the portable terminal apparatus;

provide information related to a movement time required for moving from the wireless communication apparatus to the printing apparatus, to the portable terminal apparatus; and instruct the printing apparatus to perform printing in accordance with an instruction from the portable terminal apparatus.

(((7)))

The printing service system according to (((6))), wherein the processor provided in the service server is configured to:

in a case where the user is detected from a captured image of an imager provided in the printing apparatus, instruct the printing apparatus to print the file.

(((8)))

A program causing a computer including a wireless communicator to implement:

a function of acquiring a printing required time required for printing a file;

a function of, while a user carrying the portable terminal apparatus is moving to a printing apparatus to be used for printing the file, acquiring a first movement required time as a movement time of the user required for arriving at the printing apparatus from a wireless communication apparatus that is wirelessly connected to the wireless communicator and that is installed separately from the printing apparatus; and a function of, in a case where the wireless communicator is wirelessly connected to the wireless communication apparatus, performing a control of instructing the printing apparatus to print the file at a point in time when the first movement required time becomes less than or equal to the printing required time.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A portable terminal apparatus comprising:

a processor; and a wireless communicator, wherein the processor is configured to:

acquire a printing required time required for printing a file;

while a user carrying the portable terminal apparatus is moving to a printing apparatus to be used for printing the file, acquire a first movement required time as a movement time of the user required for arriving at the printing apparatus from a wireless communication apparatus that is wirelessly connected to the wireless communicator and that is installed separately from the printing apparatus; and in a case where the wireless communicator is wirelessly connected to the wireless communication apparatus, perform a control of instructing the printing apparatus to print the file at a point in time when the first movement required time becomes less than or equal to the printing required time.

2. The portable terminal apparatus according to claim 1, wherein the wireless communication apparatus is installed at a predetermined position in a facility in which the printing apparatus is installed.

3. The portable terminal apparatus according to claim 2, wherein the processor is configured to:

in a case where the wireless communication apparatus is further installed at an entrance of a section that is provided in the facility and in which the printing apparatus is installed, acquire a second movement required time as a movement time of the user required for arriving at the printing apparatus from the wireless communication apparatus installed at the entrance of the section, and in a case where the wireless communicator is wirelessly connected to the wireless communication apparatus installed at the entrance of the section before the first movement required time becomes less than or equal to the printing required time, perform a control of instructing the printing apparatus to print the file at a point in time when the second movement required time becomes less than or equal to the printing required time instead of the first movement required time.

4. The portable terminal apparatus according to claim 2, wherein the processor is configured to:

acquire a third movement required time as a movement time of the user required for arriving at the printing apparatus from a position at which the wireless communicator is wirelessly connected to a short range wireless communication apparatus mounted in the printing apparatus, and in a case where the wireless communicator is wirelessly connected to the short range wireless communication apparatus before the first movement required time becomes less than or equal to the printing required time, perform a control of instructing the printing apparatus to print the file at a point in time when the third movement required time becomes less than or equal to the printing required time instead of the first movement required time.

5. The portable terminal apparatus according to claim 1, further comprising:

a position measurer, wherein the processor is configured to:

while the user is moving to the printing apparatus, and the wireless communicator is not wirelessly connected to the wireless communication apparatus, estimate a movement time of the user required for arriving at the printing apparatus based on a current position of the user specified by the position measurer.

6. A printing service system comprising:

the portable terminal apparatus according to claim 1;

a service server;

a printing apparatus; and a wireless communication apparatus installed separately from the printing apparatus, wherein a processor provided in the service server is configured to:

in a case where a file to be printed is acquired from the portable terminal apparatus, calculate a printing required time required for printing the file by referring to information related to the printing apparatus and attribute information of the file and provide the printing required time to the portable terminal apparatus;

provide information related to a movement time required for moving from the wireless communication apparatus to the printing apparatus, to the portable terminal apparatus; and instruct the printing apparatus to perform printing in accordance with an instruction from the portable terminal apparatus.

7. The printing service system according to claim 6, wherein the processor provided in the service server is configured to:

in a case where the user is detected from a captured image of an imager provided in the printing apparatus, instruct the printing apparatus to print the file.

8. A non-transitory computer readable medium storing a program causing a computer including a wireless communicator to implement:

a function of acquiring a printing required time required for printing a file;

a function of, while a user carrying the portable terminal apparatus is moving to a printing apparatus to be used for printing the file, acquiring a first movement required time as a movement time of the user required for arriving at the printing apparatus from a wireless communication apparatus that is wirelessly connected to the wireless communicator and that is installed separately from the printing apparatus; and a function of, in a case where the wireless communicator is wirelessly connected to the wireless communication apparatus, performing a control of instructing the printing apparatus to print the file at a point in time when the first movement required time becomes less than or equal to the printing required time.

9. A method comprising:

acquiring a printing required time required for printing a file;

acquiring, while a user carrying a portable terminal apparatus including a wireless communicator is moving to a printing apparatus to be used for printing the file, a first movement required time as a movement time of the user required for arriving at the printing apparatus from a wireless communication apparatus that is wirelessly connected to the wireless communicator and that is installed separately from the printing apparatus; and performing, in a case where the wireless communicator is wirelessly connected to the wireless communication apparatus, a control of instructing the printing apparatus to print the file at a point in time when the first movement required time becomes less than or equal to the printing required time.

* * * * *